(12) United States Patent
Miyashita et al.

(10) Patent No.: US 7,742,686 B2
(45) Date of Patent: Jun. 22, 2010

(54) SIGNAL PROCESSOR

(75) Inventors: Masahiko Miyashita, Tokorozawa (JP);
Takao Yamada, Tokorozawa (JP);
Nobuo Ohyama, Tokorozawa (JP); Kou Atsumi, Tokyo (JP)

(73) Assignee: Pioneer Corporation, Tokyo (JP)

( * ) Notice: Subject to any disclaimer, the term of this patent is extended or adjusted under 35 U.S.C. 154(b) by 1123 days.

(21) Appl. No.: 10/950,556

(22) Filed: Sep. 28, 2004

(65) Prior Publication Data
US 2005/0069285 A1 Mar. 31, 2005

(30) Foreign Application Priority Data
Sep. 29, 2003 (JP) ............................. 2003-337527

(51) Int. Cl.
*H04N 5/00* (2006.01)
(52) U.S. Cl. ......................................... 386/126; 386/55
(58) Field of Classification Search .................. 386/126
See application file for complete search history.

(56) References Cited

U.S. PATENT DOCUMENTS

| 5,375,106 A | 12/1994 | Kawachi et al. ............... 369/32 |
| 5,760,767 A * | 6/1998 | Shore et al. .................. 715/723 |
| 2002/0097255 A1 | 7/2002 | Toyoda et al. ................ 345/719 |
| 2004/0131330 A1* | 7/2004 | Wilkins et al. ................. 386/55 |

FOREIGN PATENT DOCUMENTS

| EP | 0 973 162 A | 1/2000 |
| EP | 1 229 544 A | 8/2002 |
| EP | 1 302 947 A | 4/2003 |
| EP | 1 394 791 A | 3/2004 |
| JP | 03-055985 | 3/1991 |
| JP | 05-159540 | 6/1993 |
| JP | 2003-132634 | 5/2003 |

OTHER PUBLICATIONS

"Pioneer CDJ-1000, Specifications", *DJ Resource*, pp. 1-4, XP-002316487, (Apr. 13, 2003).
"Pioneer CDJ-100, Operating Instructions", *Pioneer*, pp. 1-20, XP-002316488, (2001).
Instruction Manual for Compact Disk Player CDJ-1000, Japan, Pioneer Corporation, 2001, pp. 16-17 (with English-language translation of pp. 16-17).

* cited by examiner

*Primary Examiner*—Marsha D Banks Harold
*Assistant Examiner*—Daniel Tekle
(74) *Attorney, Agent, or Firm*—Drinker Biddle & Reath LLP

(57) ABSTRACT

A signal processor includes a point setting part that sets a position of a main image signal, as a registration point. A playback control part causes output of an image frame from the registration point used as a starting point in response to a given playback instruction. A capture processing part generates a registration image based on the main image signal and stores the registration image, the at least one image frame being placed in a neighborhood of the registration point. A point recording part writes the registration point into a memory and writes the registration image corresponding to the recorded point into the memory. A point calling part reads out the recorded image and the recorded point in response to a given calling instruction. The point setting part sets the recorded point and the recorded image as the registration point and the registration image, respectively.

13 Claims, 15 Drawing Sheets

MAIN SCREEN

SIGNAL PROCESSOR

BACKGROUND OF THE INVENTION

1. Field of the Invention

The present invention relates to a signal processor for processing signals read from an information recording medium such as a CD (Compact Disk), DVD (Digital Versatile Disk), and MD (Mini Disk).

2. Description of the Related Art

There has been developed a digital playback system capable of audio effects control in real time through tempo (BPM: Beats Per Minute) change applied to playback audio of audio data read from an information recording medium such as CD. Such a digital playback system allows users' real-time processing so as to playback audio through operation of dials and buttons, e.g., tempo acceleration, tempo deceleration, playback pause, and backward playback. With such processing, original audio effects can be extemporaneously produced by the user. Conventionally, with an analog record player, tempo change of playback audio has been done by varying the movement speed of a phonograph needle that traces grooves formed on an analog record for audio recording. This is done by users during playback of the analog record by forcibly rotating a turntable carrying thereon the analog record with a speed different from the normal rotation speed. Such tempo change and others conventionally done with the analog record player is now done by the above-described digital playback system using CDs and DVDs which store digital information.

The conventional technology relevant to such a digital playback system is found in Patent Document 1 (Japanese Patent Kokai No. 2003-132634), for example. While, in recent years, optical disks storing video information such as movies have been commonly on the market, no system is yet available for exercising real-time control over video effects during video playback from such optical disks.

SUMMARY OF THE INVENTION

In view of the foregoing, it is an object of the present invention to provide a signal processor capable of controlling playback effects of video, and particularly to provide a signal processor capable of controlling playback effects of video and audio.

According to a first aspect of the invention, there is provided a signal processor for processing image signals including a plurality of image frames. The signal processor includes a buffer memory for storing the image signal and outputting the stored signal as a main image signal; a point setting part for setting, in response to a given capture instruction, a position on a time axis of the main image signal corresponding to the capture instruction, as a registration point; a playback control part for causing the buffer memory to output the image frame from the registration point used as a starting point in response to a given playback instruction; a capture processing part for generating a registration image based on at least one image frame of the main image signal outputted from the buffer memory and storing the registration image, the at least one image frame being placed in a neighborhood of the registration point; a point recording part for writing the registration point set by the point setting part as a recorded point into a memory, and writing the registration image stored in the capture processing part as a recorded image corresponding to the recorded point into the memory; and a point calling part for reading out the recorded image and the recorded point from the memory in response to a given calling instruction. The point setting part sets the recorded point and the recorded image read out from the memory by the point calling part, as the registration point and the registration image, respectively.

According to a second aspect of the invention, a signal processor for playing back video is provided. The signal processor includes an operation part having a rotary control panel; a playback control part for controlling a playback speed of the video in real time according to rotation of the rotary control panel; a point setting part for setting, in response to a capture instruction given from outside, a position on a time axis of the video corresponding to the capture instruction, as a registration point; a capture processing part for capturing at least one image frame constituting the video under playback and for generating a registration image corresponding to the registration point on the basis of the image frame; a point recording part for writing the registration point and the registration image as a recorded point and a recorded image, respectively, into a memory; and a point calling part for reading out, in response to a calling instruction given from outside, the recorded image from the memory and displaying the recorded image on a display device.

Further features of the invention, its nature and various advantages will be more apparent from the accompanying drawings and the following detailed description of the preferred embodiments.

DETAILED DESCRIPTION OF THE INVENTION

Exemplary embodiments of the present invention will now be described.

Structure of Optical Disk Playback System

Figure 1:
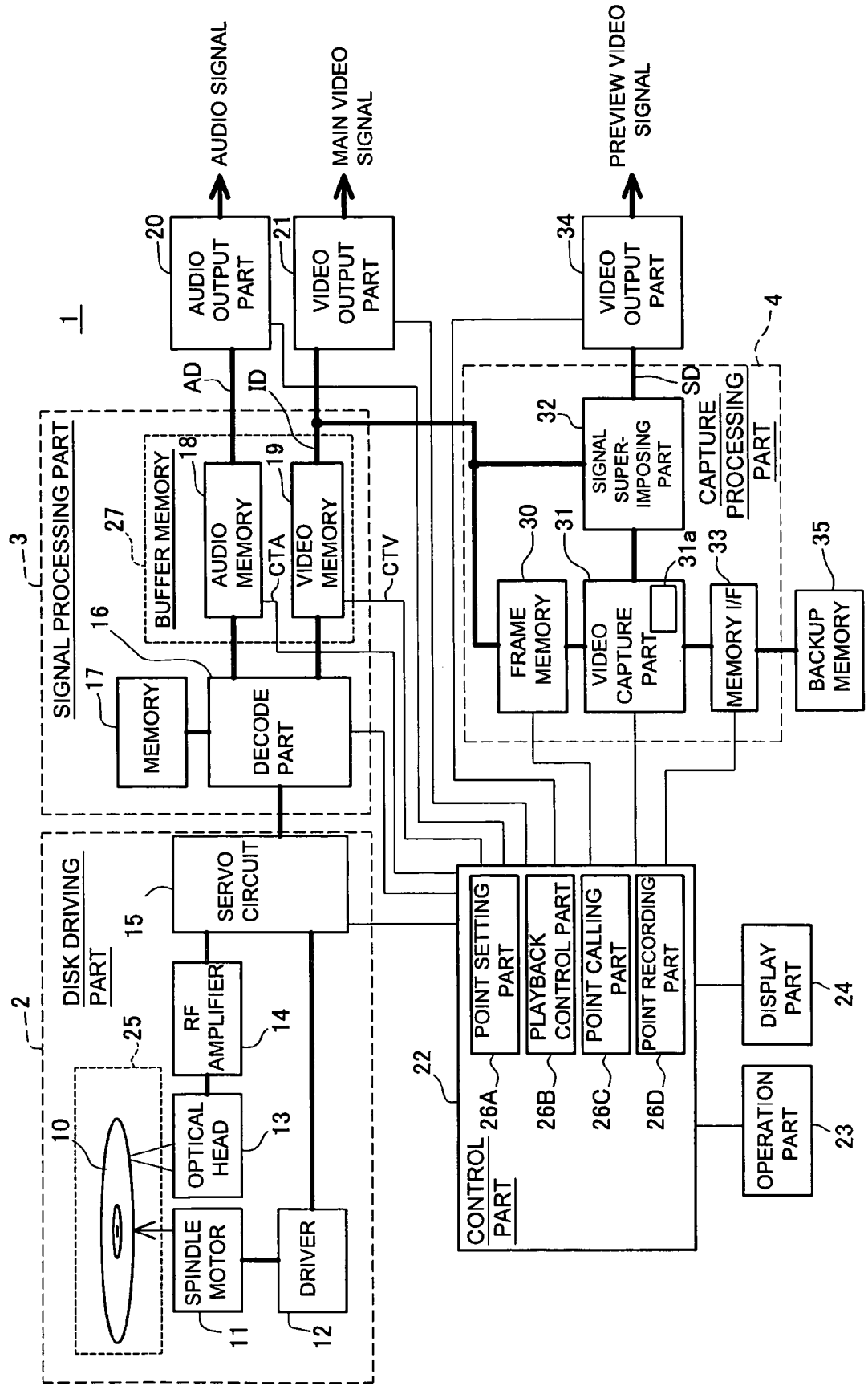
FIG. 1 is a block diagram schematically illustrating an optical disk playback system (or signal processor) which is an embodiment of the present invention.
Figure 2:
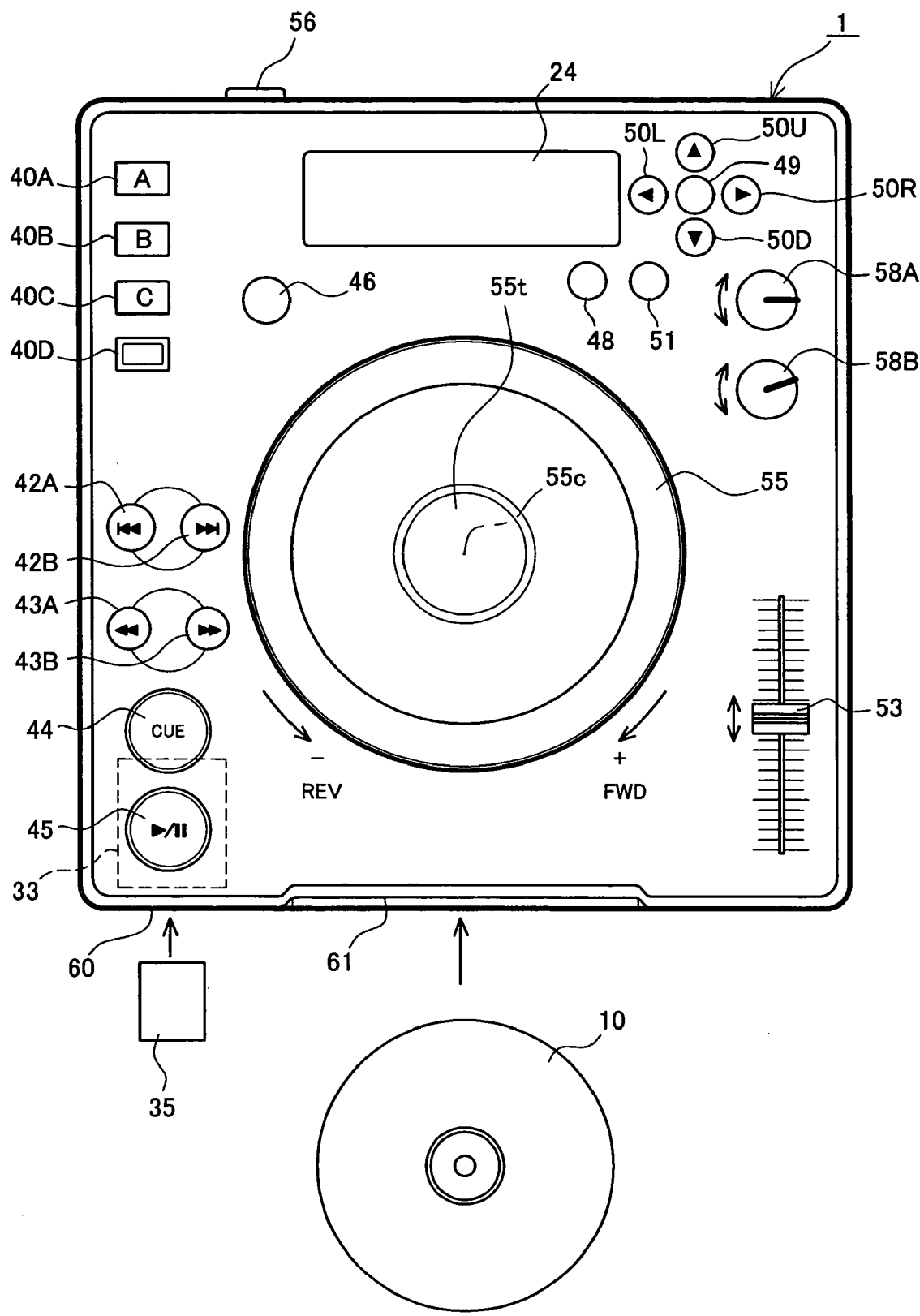
FIG. 2 is a front view schematically illustrating an outer appearance of the optical disk playback system of the embodiment.
Figure 3:
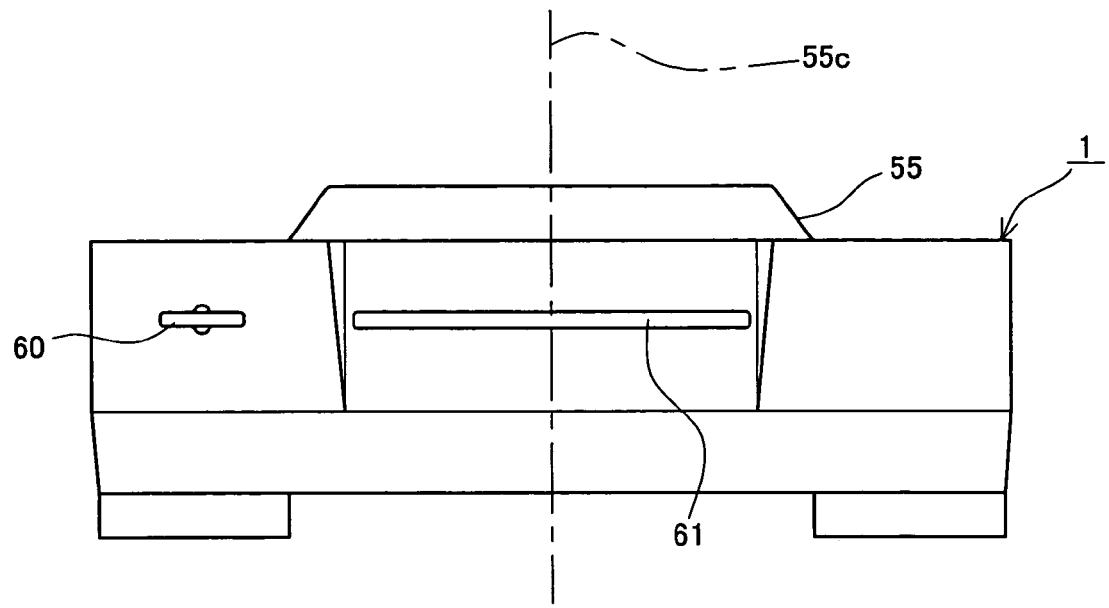
FIG. 3 is a bottom view of the optical disk playback system shown in FIG. 2.

FIG. 1 is a block diagram schematically illustrating the structure of an optical disk playback system (signal processor) 1 of this embodiment, FIG. 2 is a front view schematically illustrating an outer appearance of the optical disk playback system 1, and FIG. 3 is a bottom view of the optical disk playback system 1 shown in FIG. 2. As shown in FIG. 1, the optical disk playback system 1 includes a disk driving part (or recording medium driving part) 2, a signal processing part 3, a capture processing part 4, a control part 22, an operation part 23, a display part 24, an audio output part 20, a first video output part 21, and a second video output part 34. These processing parts 2, 3, 4, 20, 21, 23, 24 and 34 are connected to the control part 22 through a bus (not shown) for transmitting control signals and data signals.

The control part 22 incorporates a CPU (Central Processing Unit), a ROM (Read Only Memory) recording various control programs, a RAM (Random Access Memory) and an input/output interface. The control part 22 includes, as the control programs executed by the CPU, a point setting part 26A, a playback control part 26B, a point call part 26C and a point recording part 26D. While, in this embodiment, the point setting part 26A, the playback control part 26B, the point call part 26C and the point recording part 26D are implemented in the computer programs, the parts may be implemented in hardware instead thereof.

The operation part 23 supplies instructions to the control part 22 according to an external operation by a user who uses the optical disk playback system 1. The control part 22 generates various control signals in accordance with the instructions received from the operation part 23, and gives them to the processing parts 2, 3, 4, 20, 21 and 34. FIG. 2 is a front view illustrating a front panel of the operation part 23. This front panel includes various input buttons 40A, 40B, . . . and a jog dial (or rotary control panel) 55 rotatable around a center axis 55c, those of which will be described later.

The disk driving part 2 includes a spindle motor 11, an optical head 13, an RF amplifier 14, a driver 12, a servo circuit 15, and a loading mechanism (or feed mechanism) 25 for detachably loading an optical disk 10 such as a CD or DVD. Multiplexed signals of image signals and audio signals are compressed and coded in accordance with the MPEG (Moving Picture Experts Group) format or the like, are further coded in accordance with a physical format of the optical disk 10 and are recorded on the optical disk 10. When the readout of information from the optical disk 10 is performed, the spindle motor 11 is supplied with driving power from the driver 12 and is capable of spinning the optical disk 10. The driver 12 is controlled by the servo circuit 15. When the readout of the information is performed, the optical head 13 irradiates a recording layer of the optical disk 10 with a light beam, detects the return light reflected on the surface of the recording layer, and supplies the detected signal to the RF amplifier 14. The RF amplifier 14 amplifies the detected signal inputted from the optical head 13 and supplies the amplified signal to the servo circuit 15. The servo circuit 15 generates a playback signal (RF signal; Radio Frequency signal) from the detected signal supplied from the RF amplifier 14, and outputs the playback signal to the signal processing part 3. The servo circuit 15 performs servo processing to generate a tracking error signal, a focus error signal and the like from the signal inputted from the RF amplifier 14 and to supply the signals to the optical head 13.

The signal processing part 3 includes a decode part 16, a memory 17, and a buffer memory 27. The decode part 16 A/D converts an analog signal transmitted from the disk driving part 2 into a digital signal, and then, decodes the digital signal by using the memory 17 such as a RAM, separates the decoded signal into image data and audio data, and outputs the data to the buffer memory 27. The buffer memory 27 includes an audio memory 18 for temporarily storing the audio data and a video memory 19 for temporarily storing the image data, and may be constructed of, for example, a two-port memory for image data storage and a two-port memory for audio data storage. The audio memory 18 and the video memory 19 respectively latch input data at specified timings according to input/output control signals CTA and CTV supplied from the control part 22, and read out addressed storage data for output. The audio memory 18 outputs an audio signal AD to the audio output part 20, and the video memory 19 outputs a main image signal ID to the video output part 21 and the capture processing part 4. While, in this embodiment, the control part 22 makes the audio signal AD synchronize with the main image signal ID and outputs them from the buffer memory 27, asynchronous control is also possible by asynchronously outputting both the signals from the buffer memory 27.

The audio output part 20 obtains an audio signal by performing filtering processing and modulation processing on the audio signal AD inputted from the buffer memory 27 and outputs the audio signal to an external audio playback device (not shown). The video output part 21 performs gradation processing, filtering processing, noise removal processing and modulation processing on the main image signal ID inputted from the buffer memory 27 to generate a main video signal, and sends the main video signal to an external display device (not shown). The operations of the audio output part 20 and the video output part 21 are controlled by the control part 22.

The main image signal ID outputted from the video memory 19 is also supplied to the capture processing part 4. The capture processing part 4 captures the main image signal ID in response to instructions received from the control part 22, generates a registration image (or sub-image) from the captured main image signal ID, and stores the registration image.

Specifically, the capture processing part 4 is constructed of a frame memory 30, a video capture part 31, a signal superimposing part 32 and a memory interface 33. The frame memory 30 buffers the main image signal ID transmitted from the video memory 19 at a specified timing in accordance with a control signal and a timing signal transmitted from the control part 22, forms an image frame from the main image signal ID and stores the image frame. Besides, the frame memory 30 outputs the stored image frame to the video capture part 31 at a specified timing. The video capture part 31 captures the image frame inputted from the frame memory 30 in accordance with the control signal and the timing signal transmitted from the control part 22, reduces the resolution of the image frame to generate a registration image, and stores the registration image in an image memory 31a. The video capture part 31 reads out a registration image specified by the instruction from the control part 22, from among a single or a plurality of registration images stored in the image memory 31a, and supplies the specified registration image to the signal superimposing part 32. The signal superimposing part 32 superimposes the registration image from the video capture part 31 onto the main image signal ID transmitted from the video memory 19, performs OSD (On Screen Display) processing for an overlay display of character information or the like, thereby generating a composite image signal SD which is supplied to the image output part 34. The video output part 34 performs gradation processing, filtering processing, noise removal processing and modulation processing on the composite image signal SD inputted from the signal superimposing part 32 to generate a preview video signal, and supplies the preview video signal to the external display device (not shown).

Figure 4:
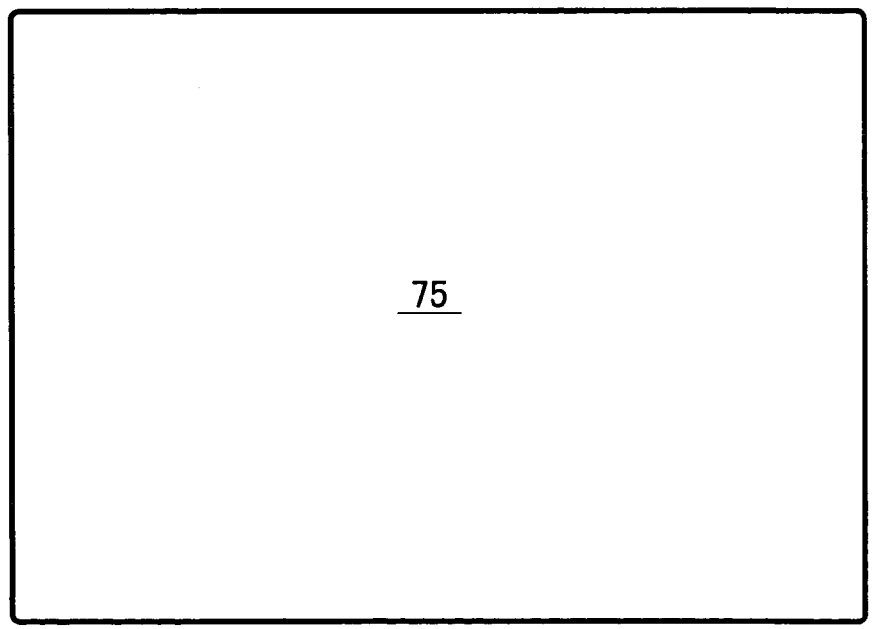
FIG. 4 is a view schematically illustrating a main video image.
Figure 5:
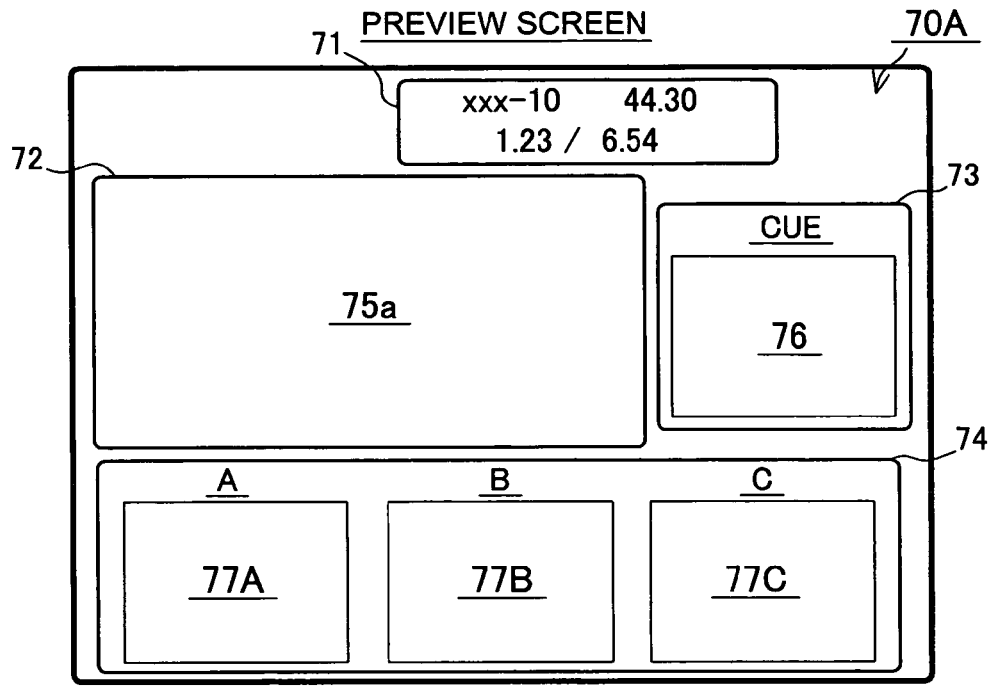
FIG. 5 is a view schematically illustrating a preview video image.

FIG. 4 is a view illustrating an image of main video 75 generated from the main video signal, and FIG. 5 is a view schematically illustrating an example of an image of preview video 70A generated from the preview video signal. The main video 75 shown in FIG. 4 can be displayed on, for example, a display device having a large screen and can be exhibited to a large audience, or can be recorded on a recording medium by a recording device.

The preview video 70A shown in FIG. 5 may be displayed on a display device having such a relatively small image size that a user of the optical disk playback system 1 can been seen. The preview video 70A includes a main display window 72, a cue display window 73, a hot cue display window 74 and a playback information display window 71. A main video 75a having the same content as the main video 75 shown in FIG. 4 is displayed on the main display window 72. This main video 75a has an image size (i.e., resolution) smaller than that of the main video 75 shown in FIG. 4. A registration image (or cue image) 76 is displayed on the cue display window 73, and three registration images (or hot cue images) 77A, 77B and 77C having thumbnail sizes are displayed on the hot cue display window 74. While, in this embodiment, the main video 75a is displayed only in the main display window 72, the main video 75a may be displayed as a background on the whole of the preview video 70A. The playback information display window 71 can display recording information of the optical disk 10, information indicating the playback state of the main video 75 and the like, for example, a file name of playback video and playback sound, a file number, the title of a musical composition of the playback sound, a playback time and a recording time. In the illustrated example, the display content "xxx-10 44.30" indicates the name "xxx" of the optical disk 10, the file number "10" of the current playback video/sound, and the total recording time "44.30" minutes of information recorded on the optical disk 10. The display content "1.23/6.54" indicates the recording time "6.54" minutes of the current playback video/sound, and the playback time "1.23" minutes at the current time point. The display content of the playback information display window 71 is also displayed on the display part 24 provided on the front panel shown in FIG. 2.

The memory interface 33 includes a terminal detachably connected to a backup memory (or recording device) 35 having a built-in nonvolatile memory or the like, and is capable of writing a registration image and an after-mentioned registration point as a recorded image and a recorded point into the backup memory 35 in response to instructions received from the control part 22. The memory interface 33 is capable of reading out the recorded image from the backup memory 35 to provide the image to the video capture part 31, and is capable of reading out the recorded point corresponding to the recorded image from the backup memory 35 to provide the point and the image to the control part 22.

Figure 6:
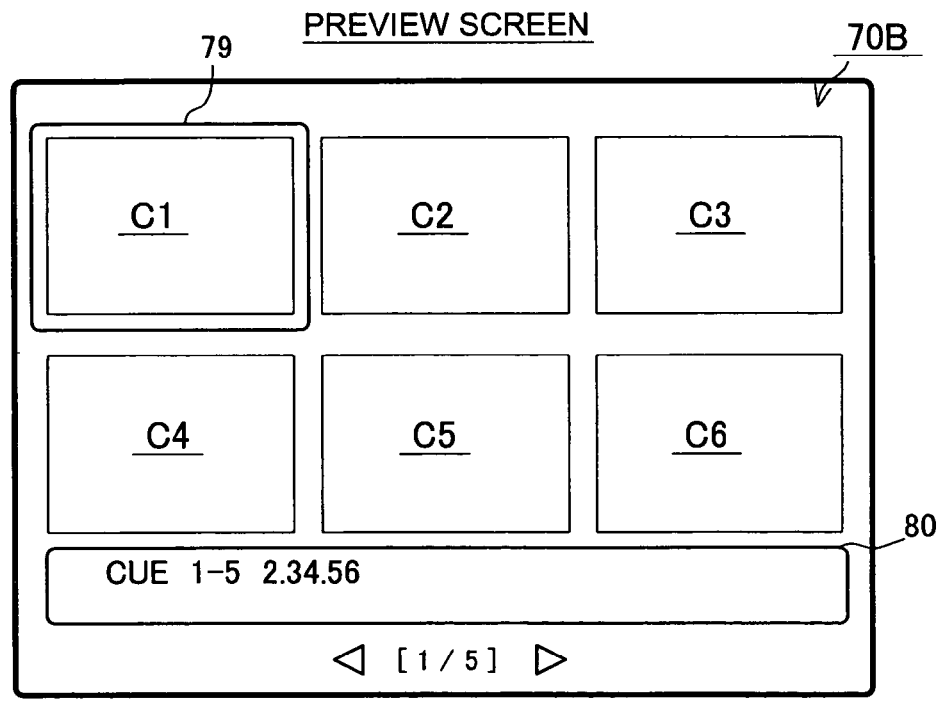
FIG. 6 is a view schematically illustrating a preview video image.

The video capture part 31 is capable of generating the composite image signal SD including the recorded image read out from the backup memory 35 in response to instructions received from the control part 22, and providing the signal SD to the video output part 34. The composite image signal SD including the recorded image is outputted to the video output part 34, converted into the preview video signal, and outputted to the display device. FIG. 6 is a view schematically illustrating an example of an image of preview video 70B generated from the preview video signal. Referring to FIG. 6, recorded images C1, C2, . . . , C6 each having a thumbnail size are displayed on one screen. The user operates the operation part 23 to move a selection frame 79, and can select any one of the recorded images C1, C2, . . . The display window 80 is an area for displaying information "CUE 1-5 2.34.56" corresponding to the selected recorded image C1.

Referring to FIG. 2, when a user presses a power supply switch 56 of the optical disk playback system 1, the control part 22 detects the press of the power supply switch 56, and then, reads and performs an initial program from a built-in ROM (not shown), and starts the system of the optical disk playback system 1. When the user inserts the optical disk 10 into a disk insertion port 61 shown in FIGS. 2 and 3, the loading mechanism 25 guides the inserted optical disk 10 into the inside and loads the disk 10 to a specified position. The user can insert a portable backup memory 35 into a memory insertion port 60 shown in FIGS. 2 and 3, and the backup memory 35 is detachably loaded. When an eject button (not shown) is pressed, the loaded optical disk 10 or the backup memory 35 may be ejected from the optical disk playback system 1.

Figure 7:
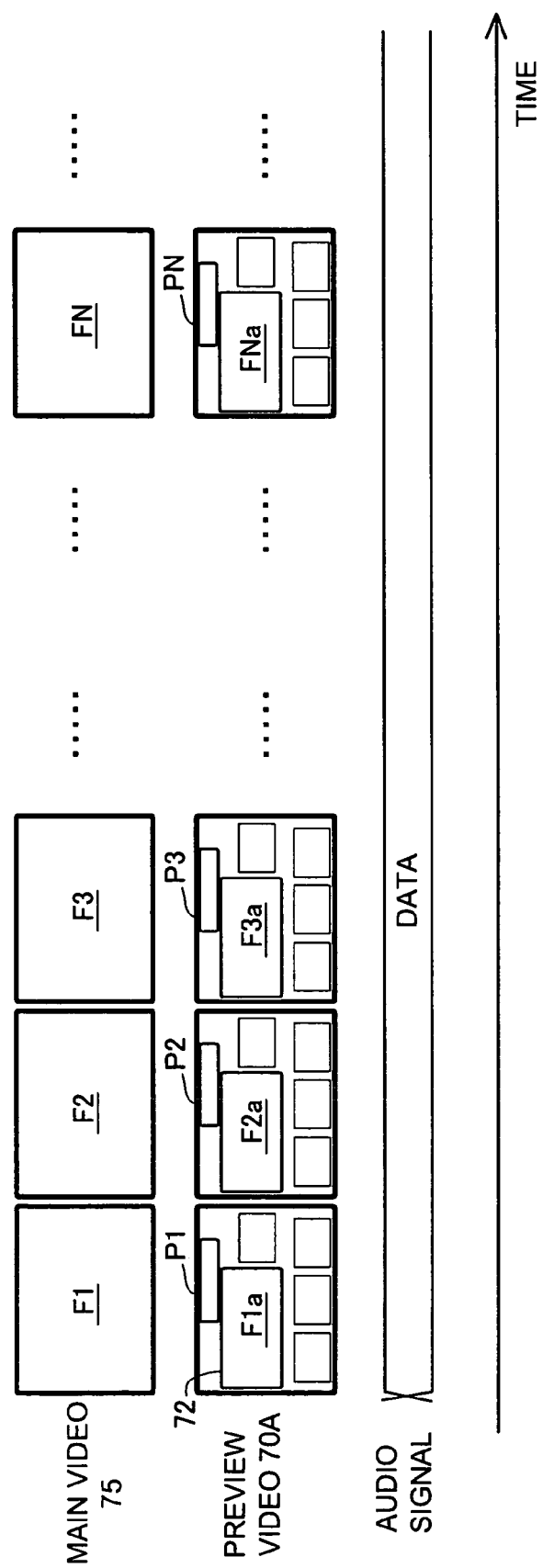
FIG. 7 is a view displaying main video and preview video on a frame basis.

The operation of the optical disk playback system 1 having the above structure will be described below in detail Basic Operation When the user presses a playback button 45 in a state where the loading mechanism 25 has loaded the optical disk 10, the control part 22 detects the press of the playback button 45, causes the recording data to be read out from the optical disk 10, and causes the playback of video and audio to be started. At this time, the playback control part 26B (see FIG. 1) provides the control signals CTV and CTA to the video memory 19 and the audio memory 18, and causes the video memory 19 and the audio memory 18 to output the main image signal ID and the audio signal AD respectively. FIG. 7 is a view illustrating, during the playback operation, the main video 75 and the preview video 70A shown in FIGS. 4 and 5 along the time axis on a frame basis. The main video 75 is played back by sequentially displaying image frames F1, F2, . . . , FN (N is a positive integer) along the time axis, and the audio signal is played back in synchronization with the playback speed of the main video 75. The preview video 70A is played back by sequentially displaying image frames P1, P2, . . . , PN (N is a positive integer) along the time axis. The image frames P1, P2, . . . , PN respectively include images F1a, F2a, . . . , FNa obtained by converting the resolution of the image frames F1, F2, . . . , FN of the main video 75. In this embodiment, for the convenience of description, the video signal is sequentially displayed (progressive-displayed) on a frame basis. Instead of the above display, an even field made of even number lines and an odd field made of odd umber lines may be alternately displayed (interlace-displayed).

When the user presses the playback button 45 during the playback operation as stated above, the control part 22 detects the press of the playback button 45, and temporarily stops an operation of the system. In detail, the playback control part 26B temporarily stops driving the optical disk 10, and causes the image frame at the time point when the playback button 45 is pressed to be repeatedly outputted from the buffer memory 27 to fix the playback video. As a result, the display device continues displaying the same image frame. In this temporary stop state, when the user again presses the playback button 45, the control part 22 detects the press and returns the system to the playback operation. When the user presses an eject button (not shown), the control part 22 terminates the playback operate, and causes the loading mechanism 25 to eject the optical disk 10.

When the user slides a slider (or speed adjustment knob) 53 upward or downward, the playback control part 26B detects the position of the slider 53 and changes the playback speed of the video and audio according to the position. As the position of the slider 53 moves downward, the playback speed becomes high, and as the position moves upward, the playback speed becomes low.

When the user presses a search button 42B or 42A, the playback control part 26B detects the press, and causes the playback position of the video and audio to be skipped in a forward direction or a reverse direction on a file basis. When the right search button 42B is once pressed, the playback position is skipped to the head position of a next file in the forward direction. When the left search button 42A is once pressed, the playback position is skipped to the head position of the current or previous file in the reverse direction. When the user presses a fast-forward button 43B or a fast-backward button 43A, the playback control part 26B detects the press, and causes the video and audio to be played back at a higher speed than a normal speed in the forward direction or the reverse direction, thereby causing the playback of the video and audio to be fast-forwarded or fast-forwarded.

In this specification, the "forward direction" is a direction according to the sequence in which the image signals and audio signals are recorded in the buffer memory 27, in other words, the time axis direction in which the video and audio are played back in a normal state. The "reverse direction" is a direction opposite to the forward direction.

Next, playback effects called "braking", "spinning" and "scratching" will be described. The playback control part 26B has the speed control function of controlling the playback speed of the main image signal ID outputted from the buffer memory 27 and the audio signal AD in real time. The "braking", "spinning" and "scratching" are playback effects produced by the speed control function. The "braking" means an effect appearing when the playback speed of the video and audio is abruptly reduced. When the user presses the playback button 45, the playback control part 26B abruptly decreases the playback speed of the video and audio at a specified change rate, and finally causes a temporary stop. Thereafter, when the user again presses the playback button 45, the playback control part 26B abruptly increases the playback speed of the video and audio to the normal speed at a specified change rate. As top adjustment knob 58A is an input unit for adjusting the change rate at the time when the playback speed of the video and audio is decreased, and a start adjustment knob 58B is an input unit for adjusting the change rate at the time when the playback speed is increased. The user operates the stop adjustment knob 58A and the start adjustment knob 58B to change the playback speed at a desired change rate, and can produce visual effects and audio effects.

The "spinning" means an effect appearing when the playback speed of the video and audio are suddenly changed to a speed different from the normal speed. When the user rotates the jog dial 55 after pressing a top plate 55t of the jog dial 55 or pressing the playback button 45 to cause a temporary stop state, the playback control part 26B detects the rotation speed and the rotation direction of the jog dial 55, and causes the video and audio to be played back at a speed corresponding to the rotation speed and the rotation direction even after the user loses hold of the jog dial 55. When the jog dial 55 is rotated clockwise, the video and audio are played back in the forward direction. When the jog dial 55 is rotated counterclockwise, the video and audio are played back in the reverse direction.

The "scratching" is an effect appearing when the v speed of the video and audio is forcibly changed. When the user rotates the jog dial 55 in a state where the top plate 55t of the jog dial 55 is pressed, the playback control part 26B temporarily stops playing back the video and audio, and then, reproduces the video and audio at a playback speed corresponding to the rotation angle (or rotation amount) and rotation direction of the jog dial 55. When the jog dial 55 is rotated clockwise, the video and audio are reproduced in the forward direction. When the jog dial 55 is rotated counterclockwise, the video and audio are played back in the reverse direction. In this way, the user operates the jog dial 55 to change the playback speed in real time, and can produce the visual effects and audio effects unique to the user.

Setting Operation of Cue Point

Figure 8:
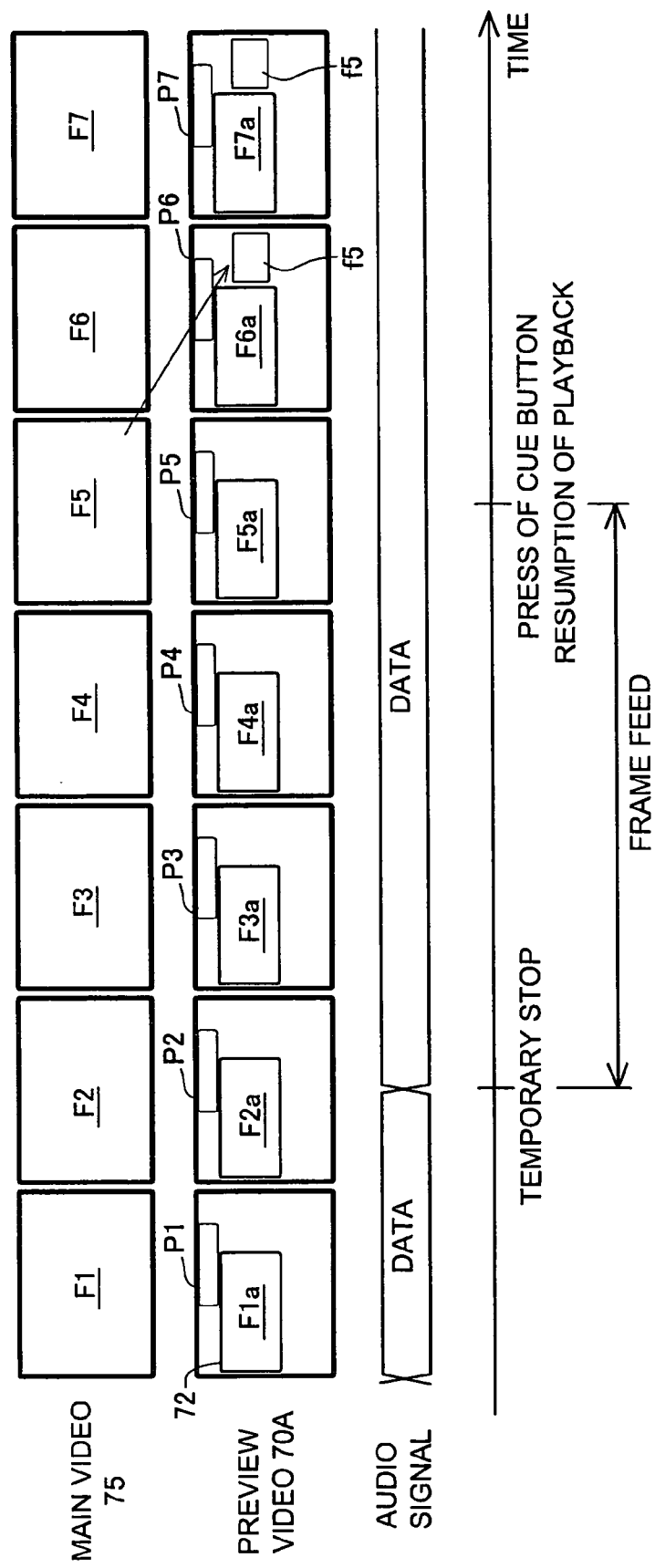
FIG. 8 is a view schematically illustrating an example of video images generated in cue point setting processing.

Next, a setting operation of a cue point as a kind of registration point will be described. FIG. 8 is a view schematically illustrating an example of video images generated by cue point setting processing. Referring to FIG. 8, image frames F1, F2, . . . are sequentially displayed in the main video 75, and audio data is reproduced in synchronization with the main video 75. During the playback operation as stated above, when the user presses the playback button 45 at the time point when the image frame F2 is displayed, a temporary stop instruction is issued from the operation part 23 to the control part 22, and the playback control part 26B causes the main image signal ID of the same frame to be outputted from the video memory 19 to fix the displayed image.

Next, when the user rotates the jog dial 55, the operation part 23 issues a frame feed instruction according to the rotation angle and rotation direction of the jog dial 55 to the control part 22, and the playback control part 26B controls the playback speed of the main video 75 according to the rotation amount and rotation direction of the jog dial 55. At this time, when the jog dial 55 is rotated clockwise, the playback control part 26B addresses the image frame in the forward direction, and when the jog dial 55 is rotated counterclockwise, the playback control part addresses the image frame in the reverse direction. In FIG. 8, by the clockwise rotation of the jog dial 55, the image frames F2, F3, F4 and F5 corresponding to the rotation angle are sequentially displayed.

Next, when the user presses a cue button 44 at the time point when the image frame F5 is displayed, a capture instruction is issued from the operation part 23 to the control part 22. At this time, the point setting part 26A instructs the capture processing part 4 to capture the main image signal ID outputted from the video memory 19 in response to the capture instruction. By this, the frame memory 30 captures the main image signal ID inputted from the video memory 19, produces the image frame F5 from the captured main image signal ID, and stores the image frame F5. At the same time, the point setting part 26A stores the playback position of the image frame F5, that is, the position on the time axis as a cue point (or registration point) into a register (not shown). Subsequently, the point setting part 26A instructs the capture processing part 4 to generate a registration image (hereinafter referred to as a "cue image") with a low resolution from the image frame stored in the video memory 19. By this, the frame memory 30 outputs the stored image frame to the video capture part 31, and the video capture part 31 converts the resolution of the image frame to generate the cue image and stores the cue image into the image memory 31a.

When the user presses the playback button 45 immediately after the press of the cue button 44, a playback instruction is issued from the operation part 23 to the control part 22, and the playback control part 26B resumes the playback of the video and audio in response to the playback instruction. At the same time, the point setting part 26A instructs the capture processing part 4 to superimpose the cue image stored in the image memory 31*a* onto the main image signal ID outputted from the video memory 19 to generate the composite image signal SD. By this, the video capture part 31 supplies the cue image to the signal superimposing part 32. The signal superimposing part 32 superimposes the cue image onto the main image signal ID inputted from the video memory 19 in a specified format, further performs OSD processing for superimposing character information, such as the file name of the playback video and the playback time, to generate the composite image signal SD, and outputs the signal SD to the video output part 34. The video output part 34 performs the gradation processing or the like on the composite image signal SD inputted from the signal superimposing part 32 to generate and output a preview video signal. Referring to FIG. 8, the cue image f5 obtained by converting the resolution of the image frame F5 and the main video 75 are superimposed, and constitute the image frames P6, P7, . . . of the preview video 70A.

In the cue point setting processing described above, the cue point is set in the temporary stop operation. The cue point may be set without undergoing the temporary stop operation by pressing the cue button 46 in real time during the playback operation.

According to the above cue point setting processing, the user can confirm the display content of the main video and the cue image on one screen through the preview video 70A, and can quickly cause a desired playback position to be stored as the cue point by the simple operation. In the case of the conventional apparatus for controlling the tempo of only the playback audio in real time, in order to reconfirm the registration point, it is necessary to actually listen to the sound near the cue point. On the other hand, in this embodiment, since the cue point corresponding to the cue image or the thumbnail image can be recorded, the user can easily associate the cue image with the audio corresponding to the cue point.

Figure 9:
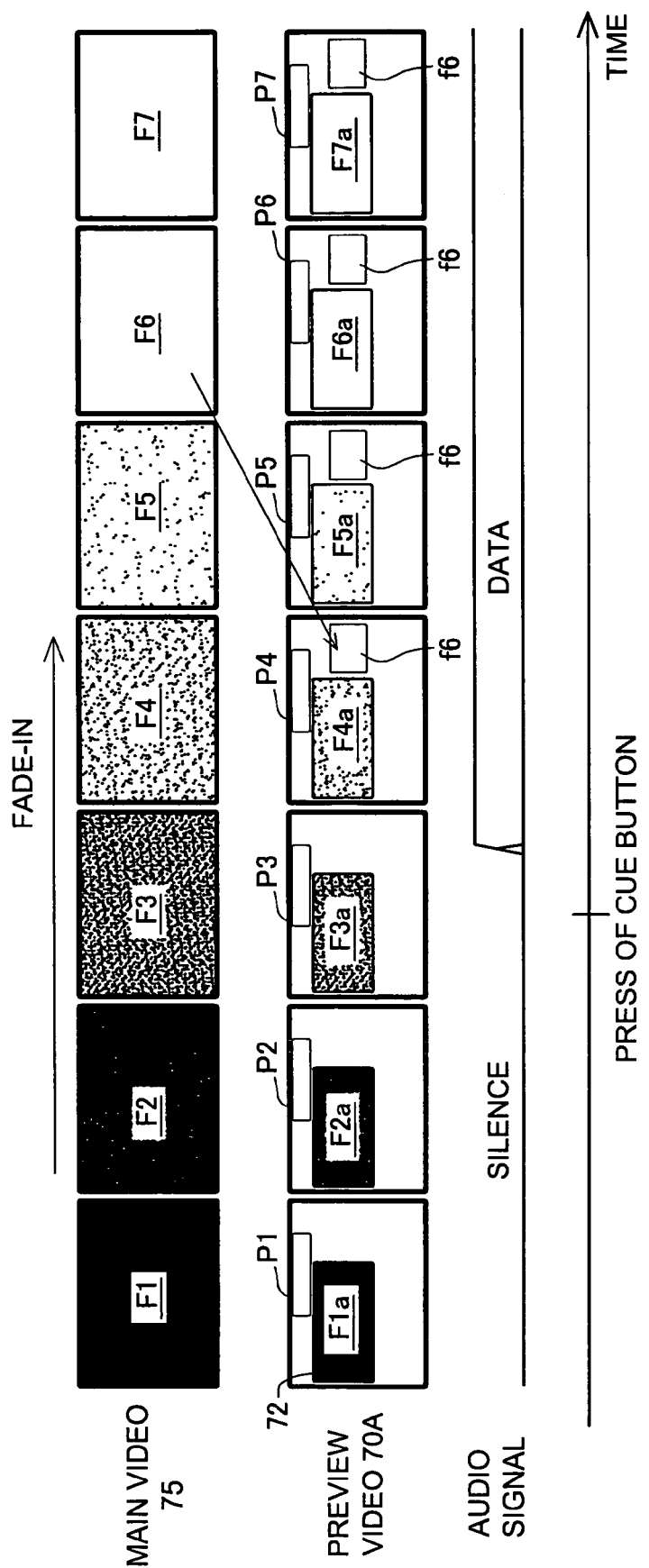
FIG. 9 is a view schematically illustrating another example of video images generated in the cue point setting processing.

As shown in FIG. 9, when the cue button 44 is pressed in a fade-in portion where the brightness of image frames F1, F2, F3, F4, F5, . . . is gradually increased, in order to avoid such a case that the cue image is generated from the image frame F3 having the low brightness at the time of the press of the cue button 44, it is preferable to generate a cue image f6 from the image frame F6 appearing three frames ahead. Accordingly, it is possible to avoid that the dark image having little information is recorded as the cue image. In the case where the fade-in portion includes many silent portions, the main image signal ID appearing a specified number of frames ahead may be captured in a manner as stated above in this embodiment. It is thereby possible to avoid such a situation that a cue image corresponding to a silent audio signal is recorded.

Figure 10:
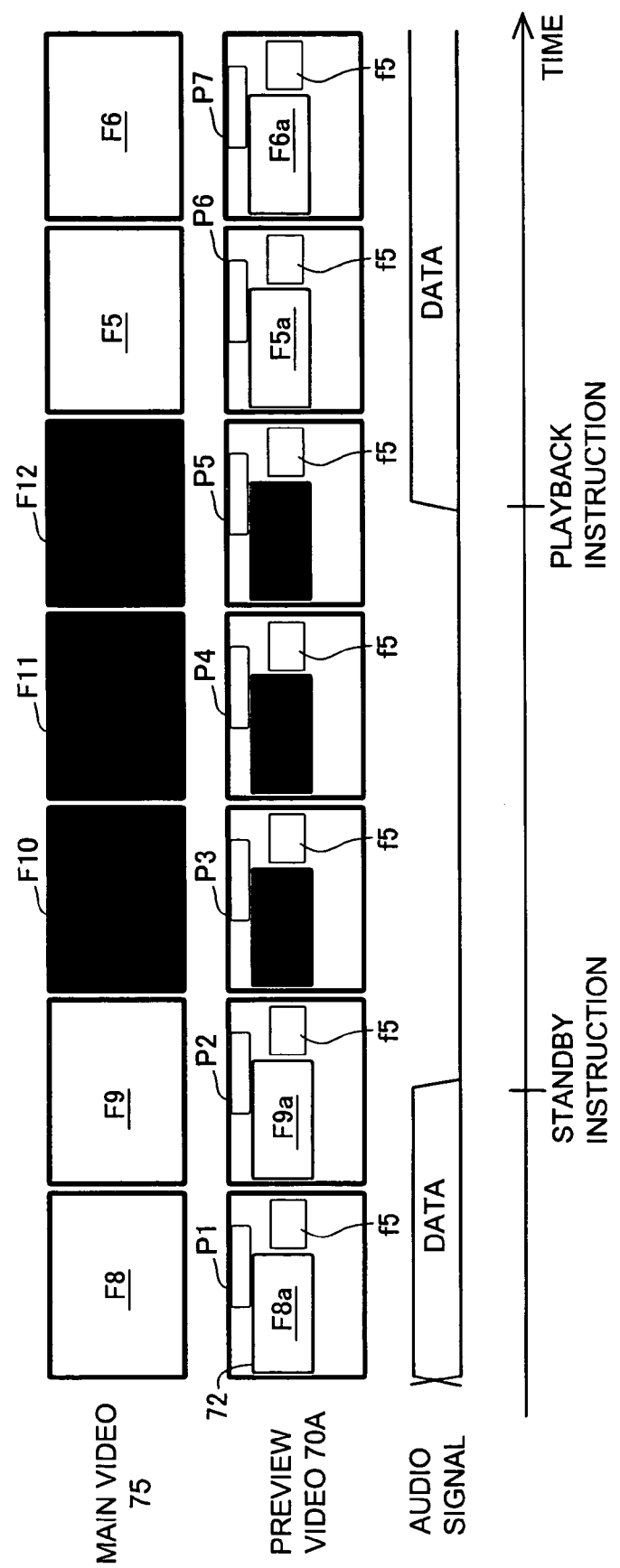
FIG. 10 is a view schematically illustrating an example of video images generated in cue point playback processing.

Next, a playback operation using the above cue point will be described below. FIG. 10 is a view schematically illustrating an example of video images generated in cue point playback processing. Referring to FIG. 10, during the playback operation of the main video 75, when the user presses the playback button 45 at the time point when an image frame F9 is displayed, a standby instruction (or back cue instruction) is issued from the operation part 23 to the control part 22. The playback control part 26B stops outputting the main image signal ID and the audio signal AD to the buffer memory 27 in response to the standby instruction, and causes the video output part 21 to output a black standby image. Referring to FIG. 10, after the standby instruction is issued, black image frames F10, F11 and F12 are displayed.

When the user presses the playback button 45 at the time point when the image frame F12 is displayed, a playback instruction is issued from the operation part 23 to the control part 22, the playback control part 26B causes, in response to the playback instruction, the buffer memory 27 to output subsequent image frames F5, F6, . . . from the cue point corresponding to the cue image f5 as a starting point.

According to the cue point playback processing, the user can simply and quickly perform operations of returning the playback position to the cue point at a desired timing while visually identifying the preview video, and of playing back the video and audio. Besides, the main video 75 is the black standby images during the period from the standby instruction to the playback instruction, and immediately after the playback instruction is issued, the playback of the video and audio is resumed from the cue point used as a starting point. Accordingly, a high impact can be given to persons seeing the main video 75. Instead of the black standby image, a standby image having a display color such as blue or red may be used.

Setting Operation of Hot Cue Point

Figure 11:
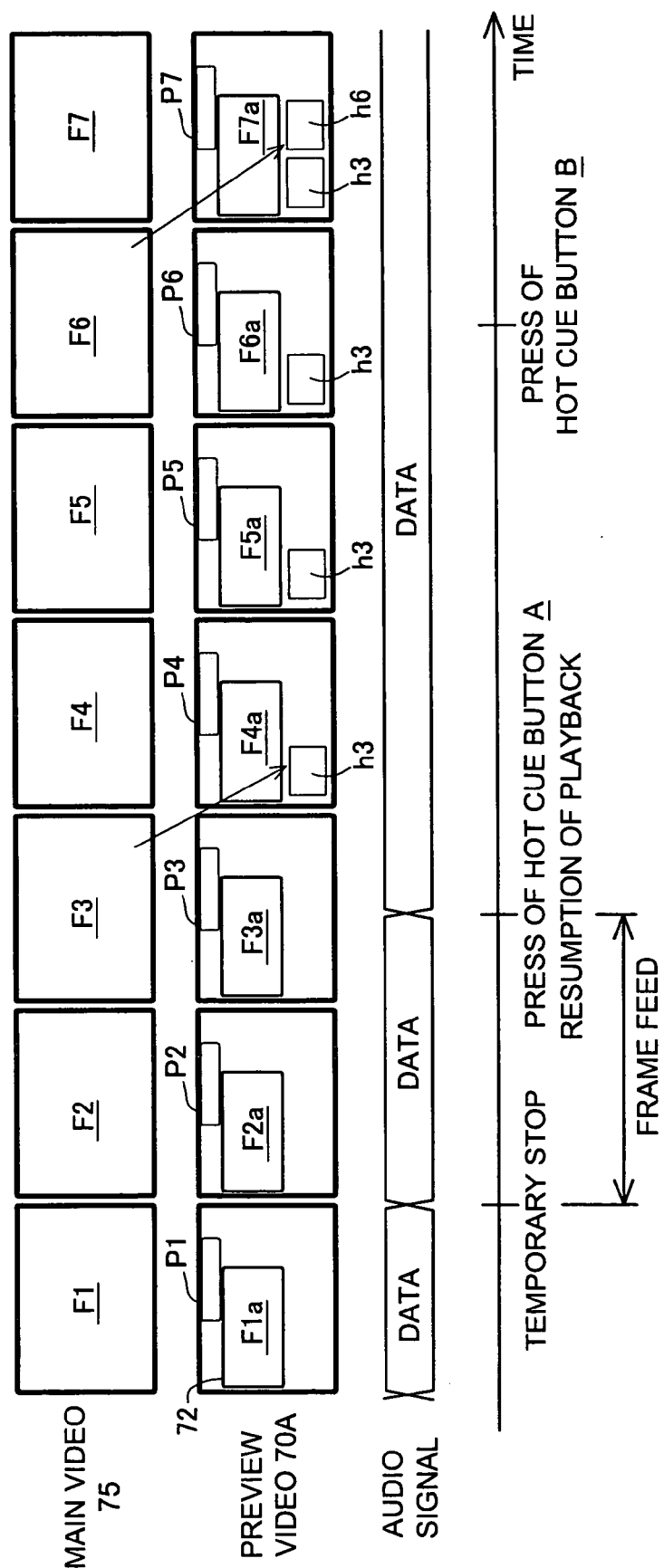
FIG. 11 is a view schematically illustrating an example of video images generated in hot cue point setting processing.

Next, a setting operation of a hot cue point as a kind of registration point will be described. FIG. 11 is a view schematically illustrating an example of video images generated in hot cue point setting processing. Referring to FIG. 11, image frames F1, F2, . . . are sequentially displayed in the main video 75, and audio data is reproduced in synchronization with the main video 75. When the user presses the playback button 45 during the playback operation as stated above, a temporary stop instruction is issued from the operation part 23 to the control part 22, and the playback control part 26B causes the video memory 19 to repeatedly output the main image signal ID of the same frame to fix the displayed image.

Next, when the user rotates the jog dial 55, the operation part 23 issues a frame feed instruction corresponding to the rotation angle and rotation direction of the jog dial 55 to the control part 22, and the playback control part 26B controls the playback speed of the main video 75 according to the rotation amount and rotation direction of the jog dial 55. At this time, when the jog dial 55 is rotated clockwise, the playback control part 26B addresses the image frame in the forward direction, and when the jog dial 55 is rotated counterclockwise, the playback control part addresses the image frame in the reverse direction. In FIG. 11, by the clockwise rotation of the jog dial 55, the image frames F2 and F3 are sequentially displayed according to the rotation angle.

Next, when the user presses the storage/playback button 40D, the control part 22 detects the press and causes the hot cue buttons 40A, 40B and 40C to flash in red. Further, when the user presses one of the hot cue buttons 40A, 40B and 40C, the control part 22 detects the press and assigns a hot cue point (or registration point) to the pressed button. Specifically, in FIG. 11, the hot cue button 40A is pressed at the time point when the image frame F3 is displayed, and the operation part 23 issues a capture instruction to the control part 22. In response to the capture instruction, the point setting part 26A instructs the capture processing part 4 to capture the main image signal ID outputted from the video memory 19. By this, the frame memory 30 captures the main image signal ID transmitted from the video memory 19, produces the image frame F3 from the captured main image signal ID, and stores the image frame F3.

Next, the point setting part 26A stores, as a hot cue point, a playback position of the captured main image signal ID, that is, a position on the time axis corresponding to the image frame F3 into a register (not shown). Subsequently, the point setting part 26A instructs the capture processing part 4 to generate a low resolution registration image (hereinafter referred to as "hot cue image") from the image frame F3 stored in the frame memory 30. In response, the frame memory 30 outputs the stored image frame F3 to the video capture part 31, and the video capture part 31 converts the resolution of the image frame F3 to generate a hot cue image h3, and stores the image h3 in the image memory 31a.

Next, when the user presses the playback button 45, the playback control part 26B starts the playback of the main video 75, the preview video 70A and the audio. At this time, the point setting part 26A instructs the capture processing part 4 to superimpose the hot cue image stored in the image memory 31a onto the main image signal ID outputted from the video memory 19 so that the main video and the hot cue image are displayed on one screen. In response, the signal superimposing part 32 superimposes the hot cue image onto the main image signal ID, and further performs OSD processing to generate the composite image signal SD, and outputs the signal SD to the image output part 34. As a result, the video output part 34 outputs the preview video signal on which the main image 75 and the hot cue image h3 are superimposed. As shown in FIG. 11, the display device displays image frames P4, P5, . . . obtained by superimposing video images F4a, F5a, . . . and the hot cue image h3.

When the user presses the storage/playback button 40D and the hot cue button 40B in turn at the time point when the image frame F6 is displayed, the point setting part 26A assigns a hot cue point to the hot cue button 40B, causes the capture processing part 4 to capture the main image signal ID, and causes to convert the resolution of the image frame F6 to generate a hot cue image h6. Subsequently, the point setting part 26A instructs the capture processing part 4 to superimpose the hot cue image h6 onto the main image signal ID. As a result, as shown in FIG. 11, the display device displays an image frame P7, . . . obtained by superimposing images F7a, . . . , and the hot cue images h3 and h6.

According to the above hot cue point setting processing, the user can confirm the display content of the main video and the hot cue image on the one screen through the preview video 70A, and can quickly set the desired playback position as the hot cue point by the simple operation. Besides, the user can confirm the hot cue point of the video and audio with a single glance of the preview video 70A. Further, in this embodiment, since the hot cue point corresponding to the hot cue image can be set, the user can easily associate the hot cue image with the audio corresponding to the hot cue point.

Figure 12:
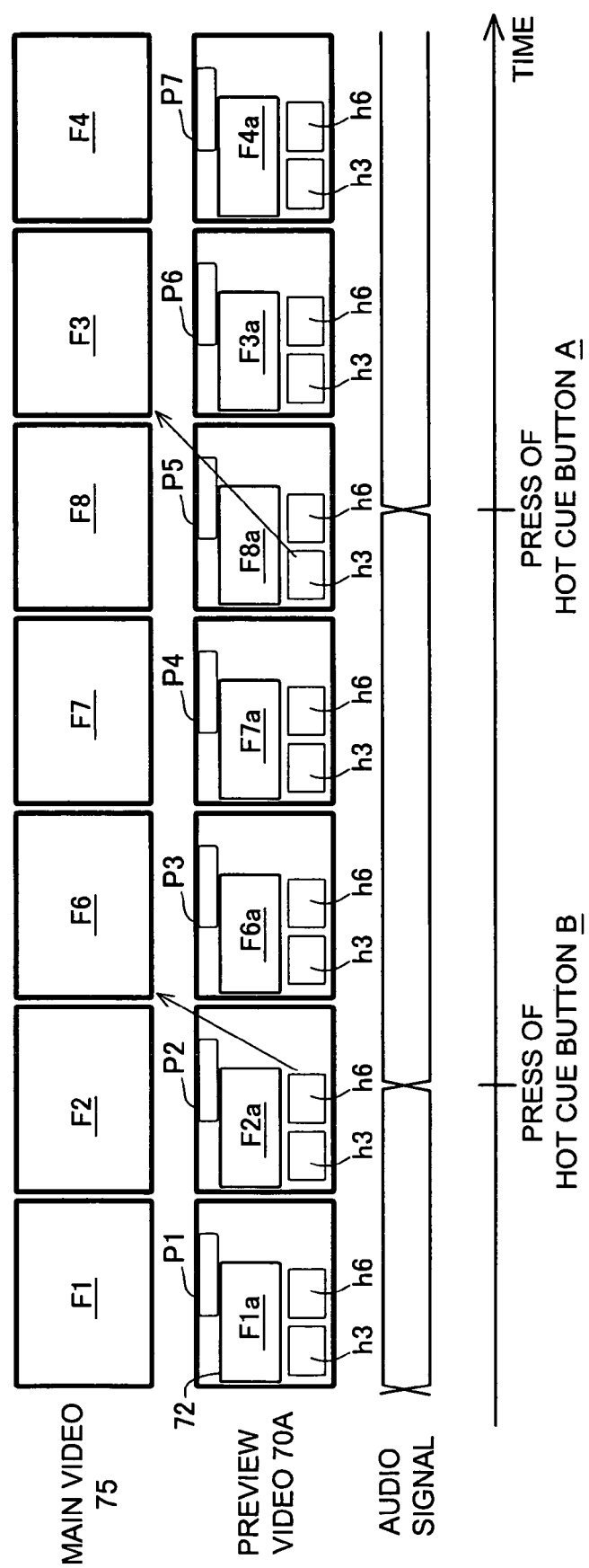
FIG. 12 is a view schematically illustrating an example of video images generated in hot cue point playback processing.

Next, a playback operation using the above hot cue point will be described below. FIG. 12 is a view schematically illustrating an example of video images generated in hot cue point playback processing. When the user once presses the storage/playback button 40D, the control part 22 changes the playback operation to a hot cue playback mode. Referring to FIG. 12, during the playback operation of the main video 75 and the preview video 70A in the hot cue playback mode, when the user presses the hot cue button 40B at the time point when an image frame F2 is displayed, a playback instruction is issued from the operation part 23 to the control part 22. In response to the playback instruction, the playback control part 26B moves the playback position of the main video 75 to the hot cue point assigned to the hot cue button 40B in real time. As a result, as shown in FIG. 12, subsequent image frames F6, F7, . . . are sequentially displayed from the hot cue point used as a starting point. The main video 75 suddenly changes from the image frame F2 to the image frame F6, and the playback sound is also changed in synchronization with the change of the frame. Thereafter, in the hot cue playback mode, when the user presses the hot cue button 40A at the time point when an image frame F8 is displayed, the playback control part 26B moves the playback position of the main video 75 to the hot cue point assigned to the hot cue button 40A in real time. As a result, as shown in FIG. 12, subsequent image frames F3, F4, . . . are sequentially displayed from the hot cue point used as a starting point.

According to the above hot cue point playback processing, the user can simply and quickly perform the operation to return the playback position of the main video 75 to the hot cue point at the desired timing in real time to reproduce the video and audio while visually identifying the preview video 70.

Operation of Point Recording/Calling

Figure 13:
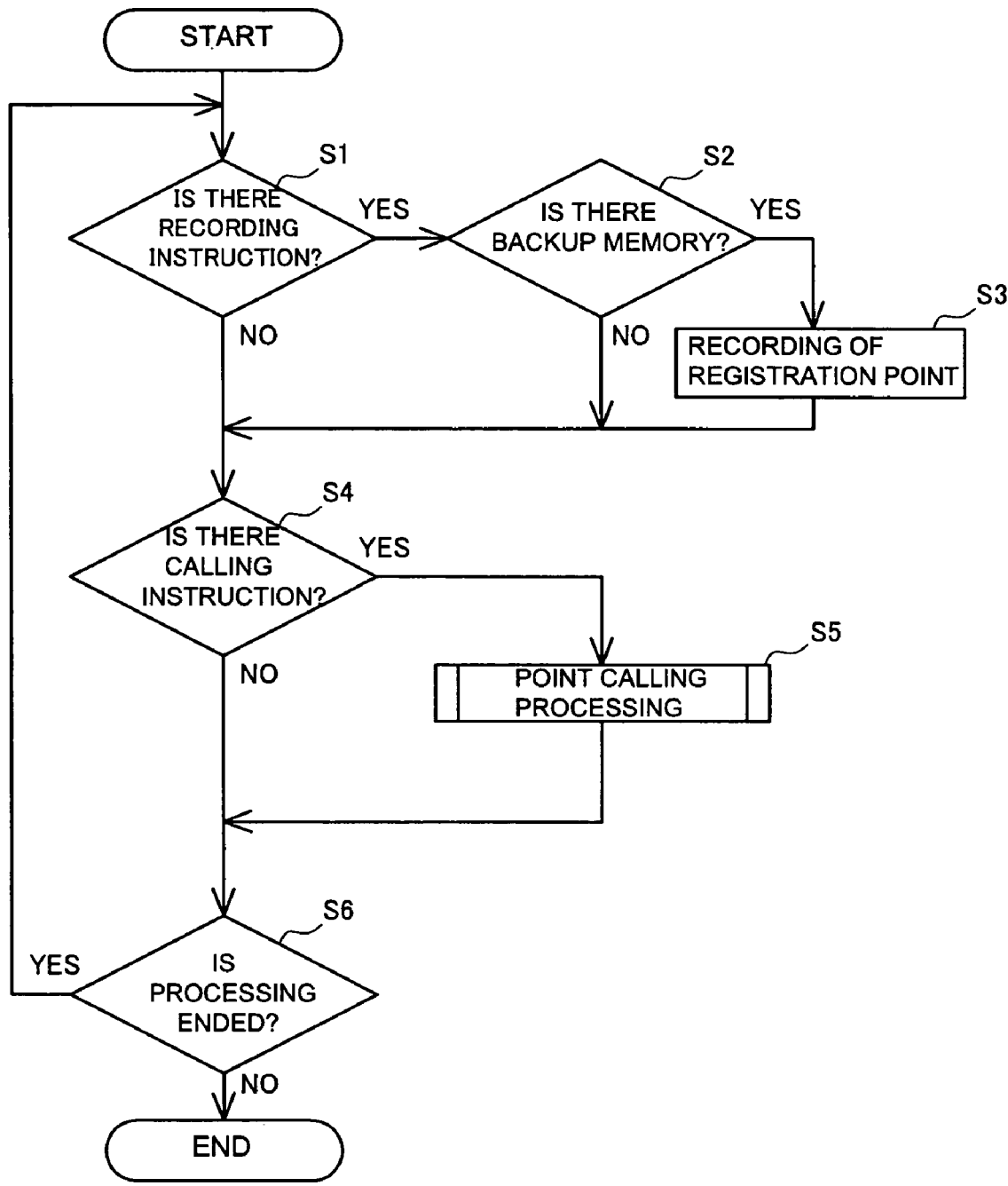
FIG. 13 is a flowchart schematically illustrating a procedure of point recording processing and point calling processing.
Figure 14:
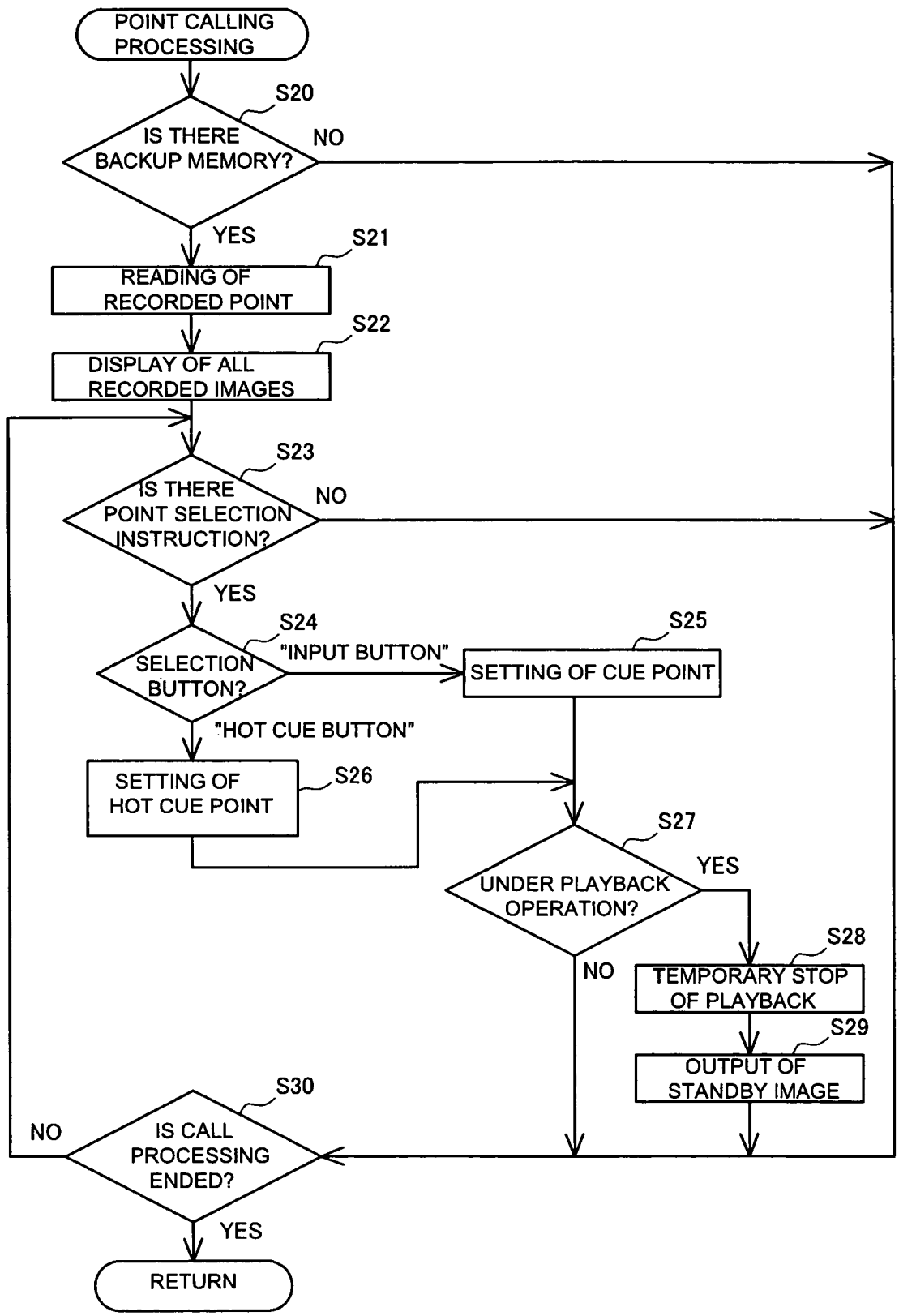
FIG. 14 is a flowchart schematically illustrating a procedure of the point calling processing.
Figure 15:
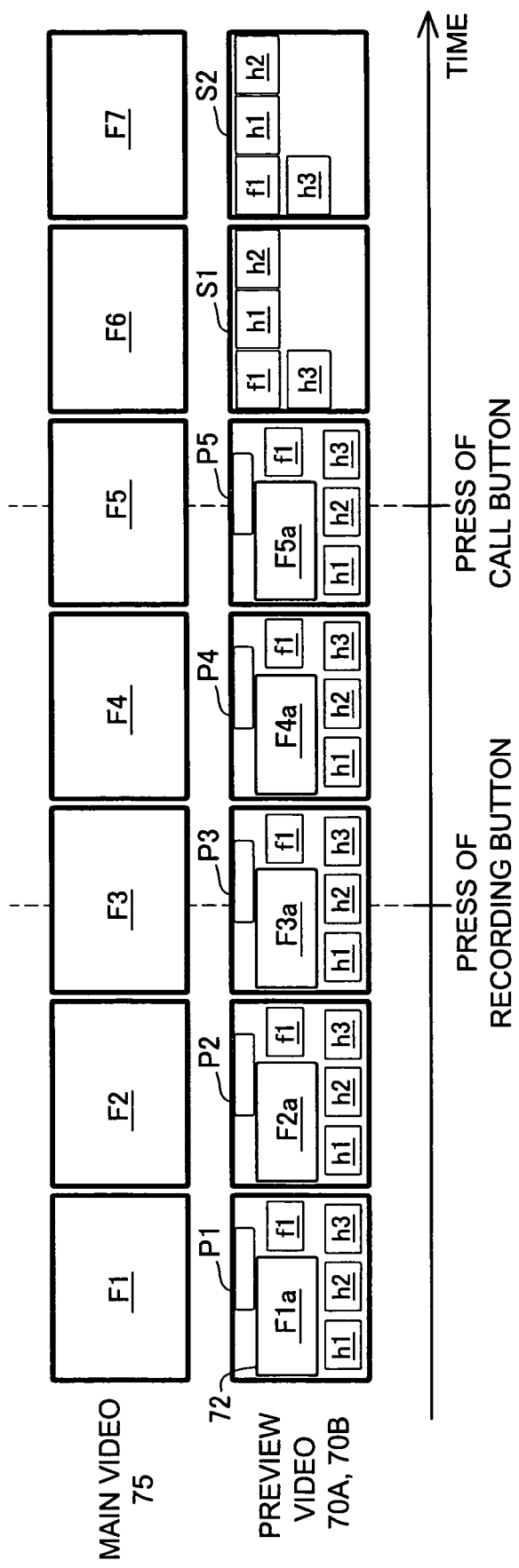
FIG. 15 is a view schematically illustrating an example of video images generated in the point recording processing.
Figure 16:
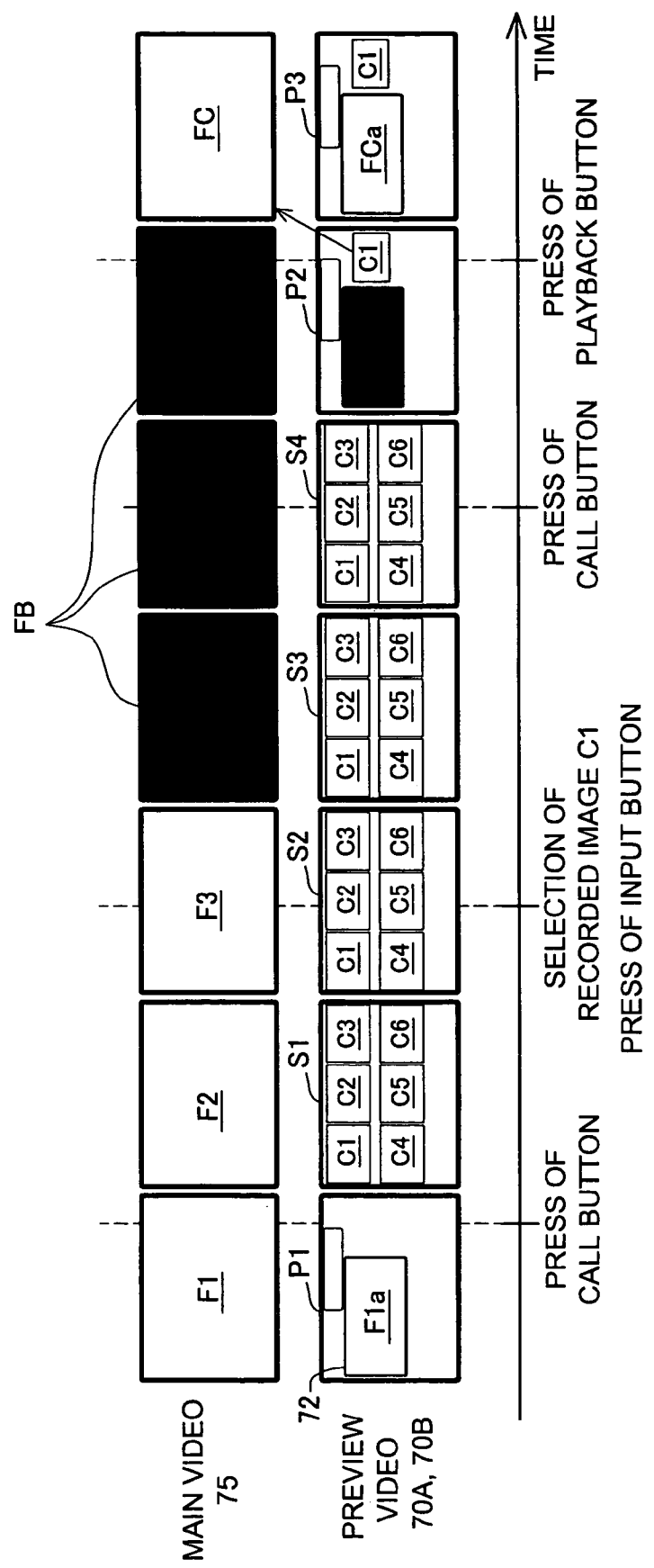
FIG. 16 is a view schematically illustrating an example of video images generated in the point calling processing.
Figure 17:
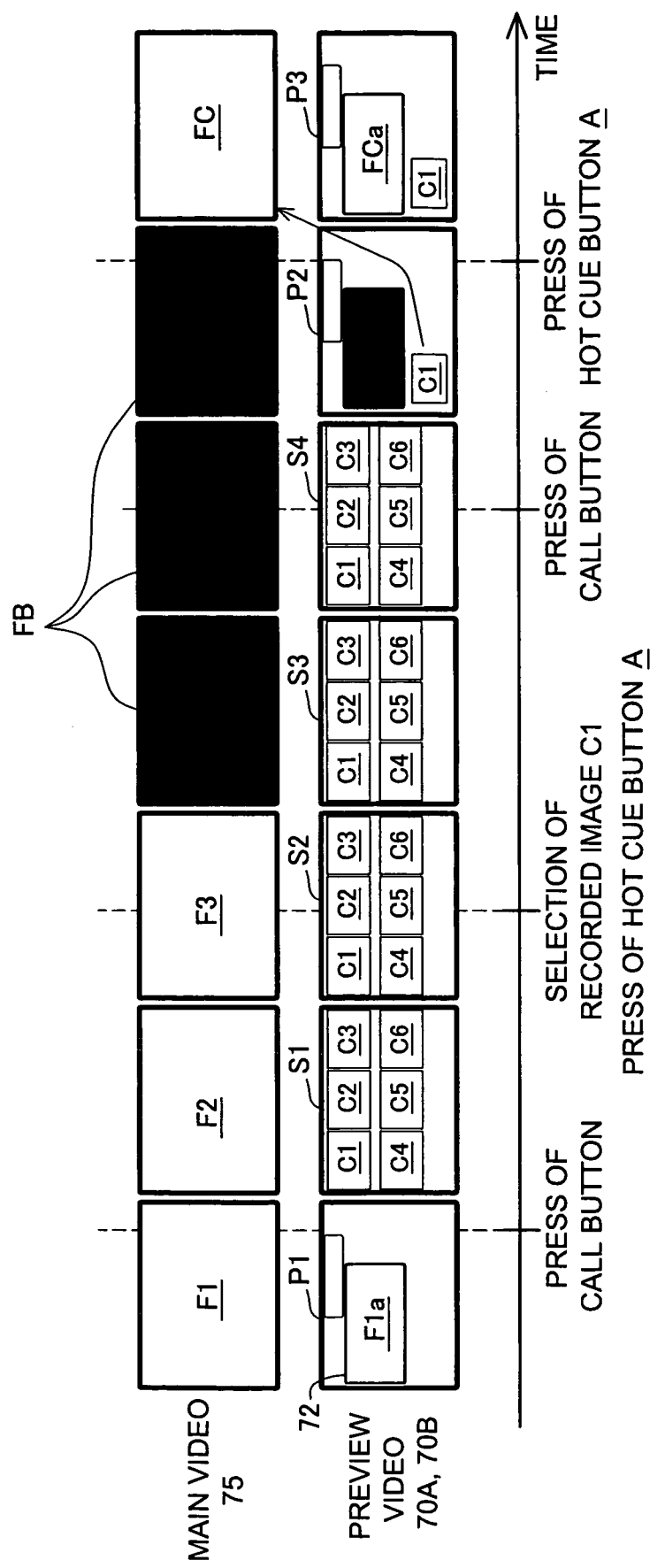
FIG. 17 is a view schematically illustrating another example of video images generated in the point calling processing.

Next, a point recording operation and a point calling operation will be described with reference to FIGS. 13 to 17. FIGS. 13 and 14 are flowcharts schematically illustrating procedures of point recording processing and point calling processing, and FIGS. 15 to 17 are views schematically illustrating examples of video images generated by the point recording processing and the point calling processing.

Referring to FIG. 13, first, at step S1, the point recording part 26D determines whether there exists a recording instruction concerning the set cue point and hot cue point. Specifically, when the user presses a recording button 51, the recording instruction is issued from the operation part 23 to the control part 22, and the point recording part 26D determines that the recording instruction exists. On the other hand, when the point recording part 26D determines at step S1 that there is no recording instruction, the procedure proceeds to step S4. At step S2 after the point recording part 26D determines that the recording instruction exists, the control part 22 determines whether there exists the backup memory 35. When the point recording part 26 does not detect the connection of the backup memory 35 to the memory interface 33, it is determined that the backup memory does not exist, and the processing proceeds to step S4. On the other hand, when the point recording part 26D detects the connection of the backup memory 35 to the memory interface 33, it is determined that the backup memory exists, and the control part instructs the capture processing part 4 to write a registration point and a registration image corresponding to the registration point into the backup memory 35, and then, the processing proceeds to step S4. By this, the video capture part 31 outputs the cue image stored in the image memory 31a, the registration image of the hot cue image, and data of the registration point corresponding to the registration images to the memory interface 33. The memory interface 33 writes the registration image and the data of the registration point into the backup memory 35. Referring to FIG. 15, image frames F1, F2, F3, . . . are sequentially displayed in the main video 75, image frames P1, P2, P3, . . . are sequentially displayed in the preview video 70A. The user presses the recording button 51 at the time point when the image frame F3 is displayed. In response, a cue image f1 and hot cue images h1, h2, h3 are written into the backup memory 35. At the same time, the data of the registration point corresponding to the registration images f1, h1, h2 and h3 are written into the backup memory 35. Hereinafter, the registration image and the registration point written into the backup memory 35 will be referred to as a recorded image and a recorded point, respectively.

At next step S4, the point calling part 26C determines whether there exists a calling instruction. Specifically, when the user presses a call button 48, the calling instruction is issued from the operation part 23 to the control part 22, and the point calling part 26C determines that the calling instruction exists. On the other hand, at step S4, when the point calling part 26C determines that there is no calling instruction, the procedure proceeds to step S6, and the control part 22 determines whether the processing should be ended. When the user presses the eject button (not shown) or the like, the control part 22 determines that this processing should be ended, and otherwise, the control part 22 repeatedly performs the processing subsequent to step S1.

When it is determined at step S4 that the calling instruction exists, the point calling part 26C performs point calling processing (step S5). FIG. 14 is a flowchart schematically illustrating a procedure of the point calling processing (step S5). First, at step S20, the point calling part 26C detects whether the backup memory 35 is connected to the memory interface 33, thereby determining whether there exists the backup memory 35. When it is determined that the backup memory does not exist, the processing proceeds to step S30. At step S30, it is determined whether the point calling processing should be ended. In the case where the point calling part 26C determined that the point calling processing should not be ended, the procedure of step S23 and the subsequent steps is repeatedly performed. On the other hand, when the user again presses the call button 48, the point calling part 26C detects the press and determines that the point calling processing should be ended, and the procedure returns to the main routine shown in FIG. 13.

On the other hand, when it is determined at step S20 that the backup memory exists, the point calling part 26C instructs the capture processing part 4 to read out the recorded point written in the backup memory 35 and the recorded image corresponding to the recorded point (step S21). In response, the memory interface 33 reads out the recorded image written in the backup memory 35 and the data of the recorded point, and provides them to the video capture part 31. The point calling part 26C instructs the capture processing part 4 to display all the read recorded images (step S22). In response, the video capture part 31 outputs the read-out recorded images to the signal superimposing part 32. The signal superimposing part 32 does not generate the composite image signal SD for the preview video 70A shown in FIG. 5, but generates instead the signal superimposing part image signal SD for the preview video 70B shown in FIG. 6. Referring to FIG. 15, the user presses the call button 48 at the time point when the image frame F5 is displayed. Subsequently to the time point, the displayed video is changed from the image frame P1 of the preview video 70A to the image frame S1 of the preview video 70B. The image frames S1 and S2 of the preview video 70B are generated by superimposing the hot cue images h1, h2 and h3 and the cue image f1 read out from the backup memory 35.

At next step S23, the point calling part 26C determines whether the point selection instruction exists. As shown in FIG. 6, a plurality of recorded images C1, C2, . . . are displayed in the preview video 70B. When the user operates the operation part 23 to select one of these recorded images C1, C2, . . . , the point selection instruction is issued from the operation part 23 to the control part 22. Specifically, the user can move the selection frame 79 by pressing movement buttons 50L, 50U, 50R and 50D shown in FIG. 2. The selection frame 79 is moved leftward when the user presses the movement button 50L, the selection frame 79 is moved rightward when the user presses the movement button 50R, the selection frame 79 is moved upward when the user presses the movement button 50U, and the selection frame 79 is moved downward when the user presses the movement button 50D. When the user presses the input button 49 or one of the hot cue buttons 40A, 40B and 40C, the recorded point and the recorded image surrounded by the selection frame 79 are selected.

When it is determined that the point selection instruction exists, the point calling part 26C determines at next step S24 which of the input button 40 and the hot cue buttons 40A, 40B and 40C is pressed by the user. When the selection button is the input button 49, the point setting part 26A sets the recorded image surrounded by the selection frame 79 and the recorded point corresponding to the recorded image, as the cue image and the cue point, respectively (step S25). At the same time, the video capture part 31 stores the recorded image as the cue image in the image memory 31a.

In the example of FIG. 16, recorded images C1, C2, . . . , C6 are stored in the backup memory 35. In the main video 75, when the user presses the call button 48 at the time point when the image frame F1 is displayed, the recorded images C1, C2, . . . , C6 and data of the recorded points are read out from the backup memory 35. Image frames S1, S2, . . . generated by superimposing these recorded images C1, C2, . . . , C6 are displayed as the preview video 70B. Further, the user selects the recorded image C1 and presses the input button 49 at the time point when the image frame F3 is displayed. The point setting part 26A sets the recorded image C1 as a cue image, and sets the recorded point corresponding to this recorded image C1 as a cue point.

In the example of FIG. 17, recorded images C1, C2, C6 are stored in the backup memory 35. In the main video 75, when the user presses the call button 48 at the time point when an image frame F1 is displayed, the recorded images C1, C2, C6 and data of the recorded points are read out from the backup memory 35. Image frames S1, S2, . . . generated by superimposing these recorded images C1, C2, . . . , C6 are displayed as the preview video 70B. The user selects the recorded image C1 and presses the hot cue button 40A at the time point when the image frame F3 is displayed. The point setting part 26A sets the recorded image C1 as a hot cue image, and sets the recorded point corresponding to the recorded image C1 as a hot cue point A.

Returning to the flowchart of FIG. 14, at next step S27, the playback control part 26B determines whether the system is under playback operation. When the main video 75 is played back, the playback control part 26B determines that the system is under playback operation, temporarily stops the playback of the main video 75 (step S28), and causes the video output part 21 to output a standby image (step S29), and then causes the procedure to proceed to step S30. On the other hand, when determining that the system is not under playback operation, the playback control part 26B causes the processing to proceed to step S30. When the user presses the call button 48, the point call part 26C detects the press, ends the point calling processing (step S30), and returns the procedure to the main routine shown in FIG. 13.

Referring to FIG. 16, after the user selects the recorded image C1 and presses the input button 49, the main video 75 is changed to a black standby image FB. When the user presses the call button 48, the point calling processing is ended, the displayed video is changed from the preview video 70B to the preview video 70A, and the image frames P2 and P3 including the cue image C1 are displayed as the preview video 70A. The user presses the playback button 45 at the time point when the image frame P2 is displayed. After the time point, in the main video 75, the cue point corresponding to the cue image C1 is used as a starting point and subsequent image frames FC, . . . are displayed from the cue point.

Referring to FIG. 17, after the user selects the recorded image C1 and presses the input button 49, the main video 75 is changed to a black standby image FB. When the user presses the call button 48, the point calling processing is ended, and then, the displayed video is changed from the preview video 70B to the preview video 70A, and image frames P2 and P3 including the hot cue image C1 are displayed as the preview video 70A. The user presses the hot cue button 40A at the time point when the image frame P2 is displayed, and after this time point, in the main video 75, the hot cue point corresponding to the hot cue image C1 is used as a start point and subsequent image frames FC, . . . are displayed from the hot cue point.

According to the point recording processing and the point calling processing described above, the user can record the registration image and the data of the registration point into the backup memory 35, can call a desired recorded image and data of a recorded point from the backup memory 35 at a desired timing, and can be set them as the registration image and the registration point. While, in this embodiment, the backup memory 35 is an external memory, the backup memory 35 may be an internal memory and may be incorporated in the optical disk playback system 1.

Since the memory interface 33 has the terminal which can be detachably connected to the backup memory 35, the registration image and the data of the registration point can be recorded in the backup memory 35 through the memory interface 33. Accordingly, the large capacity backup memory 35 can be connected to the memory interface, and the data of many registration images and registration points can be recorded therein. For example, when the backup memory 35 is prepared for each of the optical disks 10, 10, . . . , there is a use in which the backup memory 35 is exchanged according to the exchange of the optical disk 10. Further, it is possible to exchange the data of the registration image and the registration point through the backup memory 35 between the different optical disk playback systems 1 and 1.

In the point calling processing described above, when the user presses the call button 48, the recorded image and the data of the recorded point written in the backup memory 35 are read out, and the image frame including the read-out recorded image is displayed as the preview video 70B. However, there may be a case where the recorded data in the loaded optical disk 10 is not consistent with data in the backup memory 35. In order to deal with such a case, when the registration image and the data of the registration point are written into the backup memory 35, it is desirable that an identification code of the optical disk 10, together with the registration point, is written into the backup memory 35. In addition, it is desirable that when the data of the registration point is read out from the backup memory 35, the identification code, together with the registration point, is read out, and the control part 22 determines whether the identification code of the loaded optical disk 10 is consistent with the identification code read out from the backup memory 35. When both the identification codes are not consistent with each other, the control part may cause the preview video 70B to display the inconsistency between the codes, thereby requesting the user to exchange the optical disk 10.

In the foregoing, the structure and operation of the optical disk playback system 1 has been described. In the above embodiment, the still image obtained by converting the resolution of the image frame is used as the registration image. The system may be designed in such a manner that a motion image is used instead of the still image and is displayed on the cue display window 73 or the hot cue display window 74.

It is understood that the foregoing description and accompanying drawings set forth the preferred embodiments of the invention at the present time. Various modifications, additions and alternatives will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2003-337527 which is hereby incorporated by reference.

What is claimed is:

1. A signal processor for processing image signals including a plurality of image frames, comprising:
    a buffer memory for storing the image signal and outputting the stored signal as a main image signal;
    a point setting part for setting, in response to a given capture instruction, a position on a time axis of the main image signal corresponding to the capture instruction, as a registration point, and instructing generation of a registration image;
    a playback control part for causing said buffer memory to output the image frame from the registration point used as a starting point in response to a given playback instruction;
    a capture processing part, when instructed by said point setting part, for generating a registration image of a lower resolution than image frames of said main image signal based on at least one image frame of the main image signal outputted from said buffer memory and storing the registration image, said at least one image frame being placed at the registration point in a neighborhood of the registration point;
    a point recording part for writing the registration point set by the point setting part as a recorded point into a memory, and writing the registration image stored in the capture processing part as a recorded image corresponding to the recorded point into said memory, thereby recording said registration point and said registration image is said memory;
    a point calling part for reading out the recorded image and the recorded point from said memory in response to a given calling instruction; and
    a memory interface detachably connected to a recording device having said memory,
    wherein
    when connection of said recording device to said memory interface is detected, said point recording part writes the registration point and the registration image into said memory through said memory interface,
    when connection of said recording device to said memory interface is detected, said point calling part reads out the registration point and the registration image from said memory through said memory interface, and
    said point setting part sets the recorded point and the recorded image read out from said, memory by said point calling part, as the registration point and the registration image, respectively.

2. A signal processor according to claim 1, further comprising:
    a first video output part for outputting the main image signal inputted from the buffer memory to a display device; and
    a second video output part for outputting either one of the registration image and the recorded image from said capture processing part to the display device.

3. A signal processor according to claim 2, wherein said capture processing part superimposes the registration image onto the main image signal to generate a composite image signal, and provides the composite image signal to said second video output part.

4. A signal processor according to claim 2, wherein said capture processing part superimposes a plurality of the recorded images to generate a composite image signal, and provides the composite image signal to the second video output part.

5. A signal processor according to claim 1, further comprising an operation part for giving the playback instruction, the capture instruction and the calling instruction in response to an external operation.

6. A signal processor according to claim 5, wherein
said operation part includes a rotary control panel, and
said playback control part has a speed control function to control a playback speed of the main image signal in real time in response to an instruction based on a rotation angle and a rotation direction of said rotary control panel.

7. A signal processor according to claim 6, wherein said playback control part causes said buffer memory to output the main image signal in a playback direction of either one of a forward direction and a reverse direction according to the rotation direction of said rotary control panel.

8. A signal processor according to claim 1, further comprising an audio output part for supplying an audio signal to a playback device,
wherein said buffer memory stores the audio signal, together with the image signal and outputs the stored signal, and said playback control part causes the buffer memory to output and provide the audio signal to said audio output part.

9. A signal processor according to claim 8, further comprising:
a loading mechanism for detachably loading an information recording medium;
a recording medium driving part for reading out a playback signal from said information recording medium; and
a signal processing part for decoding the playback signal to generate the image signal and the audio signal.

10. A signal processor for playing back video, comprising:
an operation part having a rotary control panel;
a playback control part for controlling a playback speed of the video in real time according to rotation of said rotary control panel;
a point setting part for setting, in response to a capture instruction given from outside, a position on a time axis of the video corresponding to the capture instruction, as a registration point, and instructing generation of a registration image;
a capture processing part, when instructed by said point setting part, for capturing at least one image frame constituting the video under playback and for generating a registration image corresponding to the registration point on the basis of the image frame;
a point recording part for writing the registration point and the registration image as a recorded point and a recorded image, respectively, into a memory, thereby recording said registration point and said registration image in said memory; and
a point calling part for reading out, in response to a calling instruction given from outside, the recorded image from said memory and displaying the recorded image on a display device.

11. A signal processor according to claim 4, wherein said operation part includes at least a button which is used commonly in generation of the capture instruction, the playback instruction, and the calling instruction.

12. A signal processor according to claim 8, wherein said audio signal is outputted from said buffer memory and provided to said audio output part asynchronously with said image signal.

13. A signal processor according to claim 5, wherein said operation part includes a cue button to be operated by a user when generating said capture instruction, and a play button to be operated by the user when generating said playback instruction.

* * * * *